United States Patent
Koskinen et al.

(10) Patent No.: US 9,497,674 B2
(45) Date of Patent: Nov. 15, 2016

(54) UE REPORTING OF MOBILITY INFORMATION USEFUL FOR OPTIMIZING UE PARAMETER SETTINGS

(71) Applicant: Nokia Technologies Oy, Espoo (FI)

(72) Inventors: Jussi-Pekka Koskinen, Oulu (FI); Ilkka Keskitalo, Oulu (FI); Jarkko Koskela, Oulu (FI); Lars Dalsgaard, Oulu (FI); Jorma Kaikkonen, Oulu (FI); Woonhee Hwang, Espoo (FI)

(73) Assignee: Nokia Technologies Oy, Espoo (FI)

( * ) Notice: Subject to any disclaimer, the term of this patent is extended or adjusted under 35 U.S.C. 154(b) by 67 days.

(21) Appl. No.: 14/394,267

(22) PCT Filed: Apr. 19, 2013

(86) PCT No.: PCT/FI2013/050433
§ 371 (c)(1),
(2) Date: Oct. 13, 2014

(87) PCT Pub. No.: WO2013/156687
PCT Pub. Date: Oct. 24, 2013

(65) Prior Publication Data
US 2015/0030001 A1 Jan. 29, 2015

Related U.S. Application Data

(60) Provisional application No. 61/636,189, filed on Apr. 20, 2012.

(51) Int. Cl.
*H04W 36/00* (2009.01)
*H04W 8/08* (2009.01)
(Continued)

(52) U.S. Cl.
CPC .......... *H04W 36/0083* (2013.01); *H04W 8/08* (2013.01); *H04W 64/006* (2013.01); *H04W 24/02* (2013.01); *H04W 36/32* (2013.01); *H04W 48/20* (2013.01)

(58) Field of Classification Search
CPC .......... H04W 24/02; H04W 36/0083; H04W 36/32; H04W 48/20; H04W 64/006; H04W 8/08
USPC ........................................................ 370/331
See application file for complete search history.

(56) References Cited

U.S. PATENT DOCUMENTS

| 2004/0032340 A1 | 2/2004 | Lingafeldt et al. |
| 2008/0043672 A1* | 2/2008 | Sebire ............... H04W 36/0055 370/331 |

(Continued)

FOREIGN PATENT DOCUMENTS

| WO | 2007088381 A1 | 8/2007 |
| WO | 2009099162 A1 | 8/2009 |

(Continued)

OTHER PUBLICATIONS

International Search Report and Written Opinion received for corresponding Patent Cooperation Treaty Application No. PCT/FI2013/050433, dated Aug. 14, 2013, 15 pages.

(Continued)

*Primary Examiner* — Chi H Pham
*Assistant Examiner* — Robert Lopata
(74) *Attorney, Agent, or Firm* — Harrington & Smith

(57) ABSTRACT

A method includes determining that reporting of user equipment mobility information is to be performed. The method further includes reporting, responsive to the determining, the user equipment mobility information, the user equipment mobility information concerning at least a time period in one or both of an idle state or a connected state since a transition by the user equipment to a cell, or since a transition by the user equipment to or from a connected state with a cell, Apparatus, systems, computer programs, and computer program products are also disclosed.

40 Claims, 2 Drawing Sheets

(51) Int. Cl.
*H04W 64/00* (2009.01)
*H04W 24/02* (2009.01)
*H04W 36/32* (2009.01)
*H04W 48/20* (2009.01)

(56) References Cited

U.S. PATENT DOCUMENTS

| | | | |
|---|---|---|---|
| 2008/0220782 A1 | 9/2008 | Wang et al. | |
| 2010/0093350 A1* | 4/2010 | Wang | H04J 11/0093 455/436 |
| 2010/0120429 A1* | 5/2010 | Kazmi | H04W 36/30 455/436 |
| 2011/0130141 A1 | 6/2011 | Frost et al. | |
| 2011/0269447 A1 | 11/2011 | Bienas et al. | |
| 2012/0108252 A1* | 5/2012 | Dimou | H04W 36/32 455/450 |
| 2013/0084842 A1* | 4/2013 | Laitinen | H04W 36/32 455/418 |
| 2013/0084856 A1* | 4/2013 | Prasad | H04W 36/0088 455/434 |
| 2013/0194941 A1* | 8/2013 | Lu | H04W 52/0254 370/252 |
| 2013/0201960 A1* | 8/2013 | Kim | H04W 72/0446 370/331 |
| 2014/0003348 A1* | 1/2014 | Velev | H04W 60/06 370/328 |
| 2014/0066074 A1* | 3/2014 | Folke | H04W 36/08 455/437 |
| 2014/0206357 A1* | 7/2014 | Lu | H04W 36/16 455/436 |
| 2014/0228032 A1* | 8/2014 | Jung | H04W 8/02 455/436 |
| 2014/0357273 A1* | 12/2014 | Teng | H04W 36/32 455/436 |
| 2015/0072706 A1* | 3/2015 | Michaelsen | H04W 64/006 455/456.1 |
| 2015/0087313 A1* | 3/2015 | Kim | H04W 8/02 455/437 |
| 2015/0215830 A1* | 7/2015 | Dalsgaard | H04W 36/0094 455/444 |
| 2015/0382266 A1* | 12/2015 | Lim | H04W 8/22 455/436 |

FOREIGN PATENT DOCUMENTS

| | | |
|---|---|---|
| WO | 2011138494 A1 | 11/2011 |
| WO | 2013019153 A1 | 2/2013 |
| WO | 2013/144434 A1 | 10/2013 |

OTHER PUBLICATIONS

"Proposal for UE Assistance Information", 3GPP TSG-RAN2 Meeting #78, R2-12xxxx, Agenda Item: x.x.x, Qualcomm Incorporated, May 21-25, 2012, 2 pages.

Partial Supplementary European Search Report received for corresponding European Patent Application No. 13778643.0, dated Jan. 5, 2016, 8 pages.

"UE Assisted Information for Edda", 3GPP TSG-RAN WG2 Meeting #77bis, R2-121201, Agenda item: 7.2.2, Nokia Siemens Networks, Mar. 26-30, 2012, 4 pages.

"UE Assisted Tracking Area Update", 3GPP TSG RAN WG2 #57, R2-070199, Agenda Item: 5.6.1, LG Electronics Inc., Jan. 15-19, 2007, pp. 1-2.

"3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304, V10.5.0, Mar. 2012, pp. 1-33.

* cited by examiner

UE REPORTING OF MOBILITY INFORMATION USEFUL FOR OPTIMIZING UE PARAMETER SETTINGS

RELATED APPLICATION

This application was originally filed as Patent Cooperation Treaty Application No. PCT/FI2013/050433 filed Apr. 19, 2013 which claims priority benefit to U.S. Provisional Patent Application No. 61/636,189, filed Apr. 20, 2012.

TECHNICAL FIELD

This invention relates generally to wireless communications, and more specifically is directed toward user equipment (UE) mobility information useful for enabling a cellular network to better manage a UE's mobility and connections.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

Relevant to these teachings, smartphones may be characterized as having certain applications that run in background, for example email, social networking, RSS feeds and the like. Sometimes these background applications are downloading actual data such as an incoming email, while at other times they generate just status update, poll, or similar messages. An application requiring an internet connection may also try to maintain a network address translation (NAT) function running in the network side by sending keep-alive packets at intervals frequent enough to keep the network from closing the NAT connection for lack of use. That is, these keep-alive packets may be sent to the application server just to keep the application alive and running in the background. Traffic for such background applications has quite different characteristics than a traditional voice call.

Heterogeneous network (HetNet) operation was introduced in 3GPP Release 10, and later releases have included enhancements. There have been and are still ongoing activities in 3GPP specifying optimization features for smart (and other) phones in different network scenarios (like small cells or HetNet scenarios). Latency, throughput and UE power consumption (e.g., actual operation time of the mobile terminal/device) are metrics to assure a good user experience. These relate to the mobility management which helps assure the UE is connected to the most suitable cell with regard to the above parameters. Often the end user experience is determined by the network and is likely to differ in HetNet scenarios in future deployments of E-UTRAN, where being connected to the correct cell in the correct/most optimal manner is expected to be more critical. The most correct cell may depend on the traffic characteristics, so it is helpful to have information about the current mobility status of the user equipment. Also it is known that UE mobility is one of the factors for the network to use to set UE individual connection release timer values.

SUMMARY

This section contains examples of possible implementations and is not meant to be limiting.

In an exemplary embodiment, a method is disclosed that includes determining that reporting of user equipment mobility information is to be performed. The method further includes reporting, responsive to the determining, the user equipment mobility information, the user equipment mobility information concerning least a time period in one or both of an idle state or a connected state since a transition by the user equipment to a cell, or since a transition by the user equipment to or from a connected state with a cell.

An additional exemplary embodiment includes a computer program, comprising code for performing the method of the previous paragraph, when the computer program is run on a processor. Another exemplary embodiment is a computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: determining that reporting of user equipment mobility information is to be performed; and reporting, responsive to the determining, the user equipment mobility information, the user equipment mobility information concerning least a time period in one or both of an idle state or a connected state since a transition by the user equipment to a cell, or since a transition by the user equipment to or from a connected state with a cell.

In a further exemplary embodiment, an apparatus is disclosed. The apparatus includes: means for determining that reporting of user equipment mobility information is to be performed; and means for reporting, responsive to the means for determining, the user equipment mobility information, the user equipment mobility information concerning least a time period in one or both of an idle state or a connected state since a transition by the user equipment to a cell, or since a transition by the user equipment to or from a connected state with a cell.

An exemplary computer program product includes a computer-readable medium bearing computer program code embodied therein for use with a computer. The computer program code includes: code for determining that reporting of user equipment mobility information is to be performed; and code for reporting, responsive to the determining, the user equipment mobility information, the user equipment mobility information concerning least a time period in one or both of an idle state or a connected state since a transition by the user equipment to a cell, or since a transition by the user equipment to or from a connected state with a cell.

DETAILED DESCRIPTION OF THE EXAMPLE EMBODIMENTS

DETAILED DESCRIPTION OF THE DRAWINGS

Figure 1:
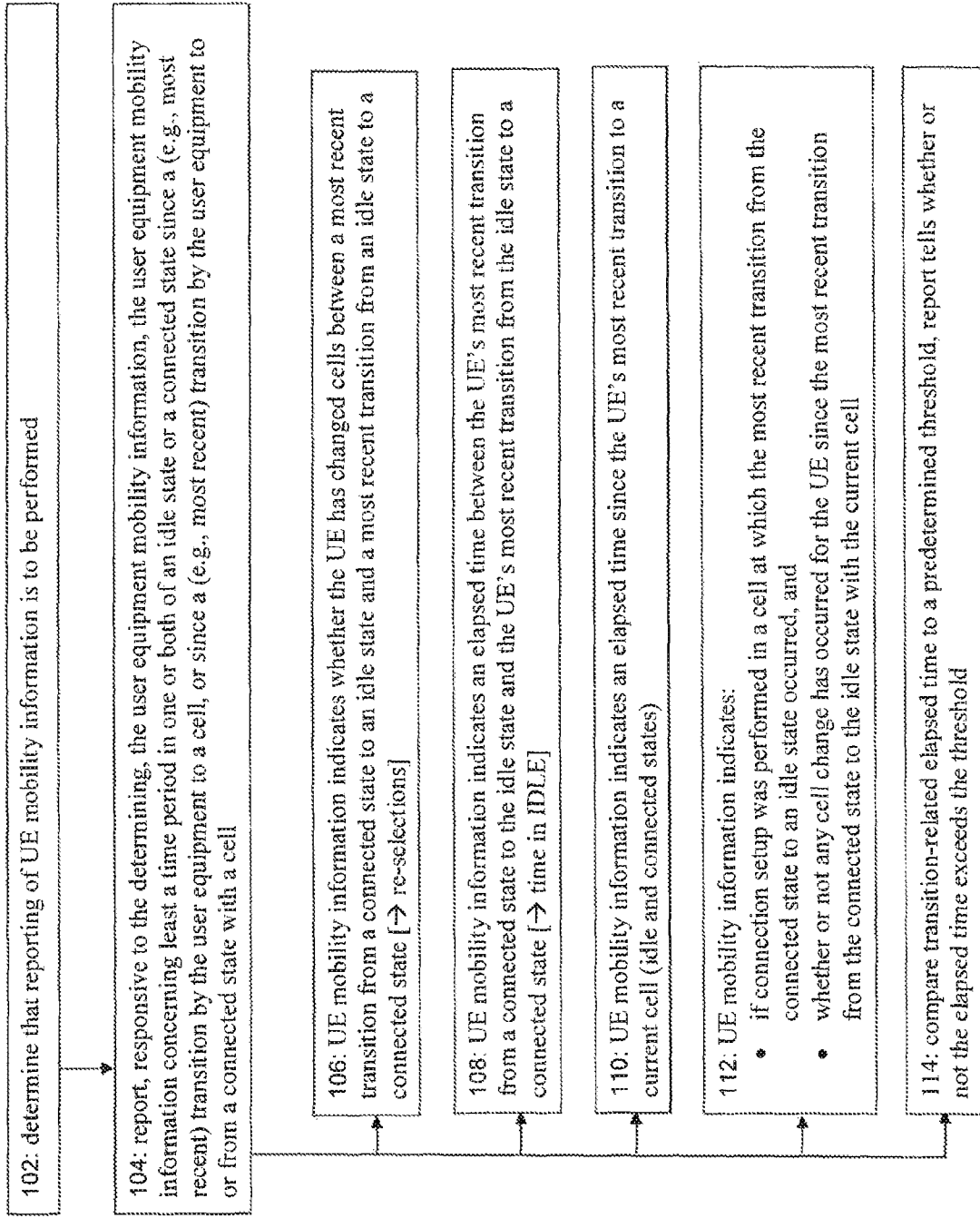
FIG. 1 is a logic flow diagram that illustrates the operation of a method, and a result of execution by an apparatus of a set of computer program instructions embodied on a computer readable memory, in accordance with the exemplary embodiments of this invention.

In conventional UTRAN and E-UTRAN systems, the 'mobility state' of a user equipment (UE) in the IDLE and in the RRC CONNECTED states are based on the number of re-selections or handovers the UE has experienced during some period of time. This mobility state is then used to scale certain re-selection or handover parameters such as Treselection (for re-selection) and Time-To-Trigger (for handover). Similarly, when the UE is in the RRC CONNECTED state, it is possible for the network itself to accumulate the number of handovers over some time period and, based on this, determine the suitable parameters for the UE's mobility management then signal those parameters to the UE. This mobility state information is estimated for the IDLE and for the RRC CONNECTED states separately, so once a UE moves from IDLE to CONNECTED the UE or network will clear its re-selection/handover count and begin again to estimate the UE's mobility state.

But this does not allow the network to reliably detect whether the UE will stay at the coverage area of the current serving cell for an extended period of time, to know whether the UE is slow moving or stationary, or whether the UE is moving more actively and therefore most likely will continue moving to other cells. The UE may know its velocity, but the reselection rate looks too far into the UE's past behavior and the current mobility state measurements do not give the UE other necessary information relevant for determining the immediate or expected future level of mobility. This becomes more important when there are different types of traffic as with smartphone applications that are intermittent and bursty which exist alongside other possible traffic types like voice calls. The conventional existing mobility state estimation (MSE) feature in conventional UTRAN and E-UTRAN systems is not seen to be sufficient for the network to assure the UE is in the most optimal cell. Also for the network to configure UE efficiently from a power saving point of view, some assistance information from the UE about the UE mobility information is useful.

Infrequent or bursty type of data transmissions such as for example frequent transmission of background type of traffic (intermittent and typically small packet transmissions) is causing different types of problems for the cellular radio system that have not been encountered earlier and which adversely impact the network's performance. For example, the increased signaling load caused by more frequent radio resource control (RRC) state changes between IDLE and CONNECTED states of operation, or frequent handover signaling if the network keeps the UE in the CONNECTED state. The network might sometimes avoid the signaling overhead associated with state transitions by deciding to keep the UE in the CONNECTED state, but this affects the UE's power consumption. Specifically, the UE's power consumption is higher in the CONNECTED state due to monitoring the physical downlink control channel PDCCH, which the UE checks to see if the network has scheduled radio resources for it. The enhanced Diverse Data Applications (eDDA) is to look into and provide better solutions to the above concerns.

In order for the network to make well-informed decisions about when to release a UE's connection or not, and when it would be better to keep the UE in the RRC CONNECTED state with an appropriate discontinuous reception (DRX) configuration, the UE can provide the network with some assistance information. One family of assistance information considered under eDDA relates to the traffic characteristics; that is the access duty cycle of the UE/device. Other relevant information relates to the level of UE mobility. Knowledge of the UE's level of mobility, whether the UE is not moving, moving slow, medium or fast, is an important factor when determining the optimal configuration and when trying to optimize the signaling load for mobility (handovers) and state transitions. The level of mobility, and even the conventionally measured number of cell changes per time interval, is influenced by many factors such as the UE velocity, direction of the UE's movement and size of the cell.

As noted above, it is desirable for the network to reliably know whether the UE will stay at the coverage area of the current serving cell for an extended period of time or whether the UE is most likely to continue moving to other cells. Better knowledge about the UE's mobility allows the network to provide more optimized mobility parameters to at least the semi-stationary UE's and the UE configuration, which would result in a better optimized end user experience and also improved network operation. The mobility state estimation algorithm currently in use with the UTRAN and E-UTRAN systems is generally seen as being rather imprecise, and additionally uses a relatively long history which tends not to give reliable indications of what is likely to happen in the near future.

Related teachings concerning a timer and signaling of assistance information may be seen at co-owned provisional U.S. Patent Application Ser. No. 61/615,549, filed on Mar. 26, 2012, which was later filed as PCT/FI2013/050310, filed on Mar. 20, 2013.

The description below refers in part to FIG. 1, which is a logic flow diagram summarizing some of the non-limiting and exemplary embodiments of the invention. FIG. 1 may be considered to illustrate the operation of a method, and a result of execution of a computer program stored in a computer readable memory, and a specific manner in which components of an electronic device are configured to cause that electronic device to operate, whether such an electronic device is the access node in full or one or more components thereof such as a modem, chipset, or the like.

The various blocks shown at FIG. 1 may also be considered as a plurality of coupled logic circuit elements constructed to carry out the associated function(s), or specific result of strings of computer program code or instructions stored in a memory. Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

In accordance with exemplary teachings herein, to help the network to identify the UE mobility activity, the UE indicates to the network if the UE has moved (changed its serving cell or how many times) since the last connection release to idle. So for example if the UE establishes connection to the same cell in which the last connection was released, without having changed cells before the next connection establishment, this is indicated to the network. Stated more generally and as shown at block 104 of FIG. 1, the UE reports its mobility information concerning at least for a time period since a (e.g., most recent) transition to a cell, or to or from a (e.g., most recent) CONNECTED state with a cell. Typically, the time period concerns the most recent transition to a cell, or to or from a (e.g., most recent) CONNECTED state with a cell. It is noted, however, that reporting by the UE may be performed after a handover (e.g., in case of requested reporting), and the reporting may therefore involve a report including information that occurred prior to the most recent handover.

In some examples below the time period is understood beforehand among the UE and the network and the UE mobility information can tell if there was or was not a transition. For example, if the understanding is that the time period is from the most recent transition from the CONNECTED state with the current cell (the connection release in the above example), the UE can report even as little as a single bit to tell the network if the UE has or has not changed cells prior to this report (which may be sent while establishing a new RRC connection or during an existing RRC connection). In other examples below the meaning is understood beforehand and the UE mobility information can tell the network how long the UE was in its past IDLE state (most recent transition from a CONNECTED state), or in a past CONNECTED state (most recent transition to a CONNECTED state), or a combination of both past IDLE and past CONNECTED states under the same cell (most recent transition to the current cell). In this manner, the UE mobility information is much more timely and a better predictor of where the UE will be located in the near future than a ratio of how many reselections the UE has performed over some long period of time.

Consider a few other example implementations. If the UE has moved (changed to a different cell(s)) after the connection release (and even returned to same cell), when the UE establishes a new connection, the UE indicates to the network that the UE has moved. In this case block 106 of FIG. 1 states that the reported UE mobility information indicates whether the UE has changed cells between a most recent transition from a CONNECTED state and a most recent transition to a CONNECTED state (that is, corresponding to a time period in an IDLE state). In block 106, the "→reselections" indicates what the UE could report to the network, i.e., that the UE has performed re-selections while in idle. The indication can be just one bit of digital information in an exemplary embodiment.

The UE may also indicate to the network how much time has elapsed since the last connection was released; that is, the UE indicates the time spent in IDLE state. In this case block 108 of FIG. 1 states that the reported UE mobility information indicates an elapsed time between the UE's most recent transition from a CONNECTED state and the UE's most recent transition to a CONNECTED state, since the UE is reporting the mobility information once it is back in a CONNECTED state with the cell. But note that depending on what triggers the reporting of this UE mobility information, the cell to which the UE reports may not always be the cell with which the UE made that most recent transition to its current CONNECTED state; there may have been a handover which left the UE's RRC connection intact and the UE is reporting to its serving cell after the handover. That is, this refers to a case where the mobility indication is not sent immediately after connection establishment. There could be a specific hand-shake procedure to send the information, but that procedure may not happen in the cell where the connection was set up; instead, the UE may soon be handed over to a new cell after connection setup. In block 108, the "→time in IDLE" indicates that the mobility information concerns the time in the IDLE state.

The UE can alternatively indicate to the network how much time has elapsed since the UE moved (through handover in the connected state or after selection/re-selection in the idle state) to the cell; that is the total time spent in the cell in both IDLE and RRC CONNECTED states. In this case block 110 of FIG. 1 states that the reported UE mobility information indicates an elapsed time since the UE's most recent transition to a current cell, regardless of whether the UE had any transitions to or from the CONNECTED state in that time period.

Additionally, for any of the above examples the UE can furthermore indicate if the connection setup is performed in the cell where the connection was released the last time, and whether any cell change (e.g., transition such as reselection handover) has been performed or no cell re-selections have happened in between. In this case block 112 of FIG. 1 states that the reported UE mobility information indicates if connection setup was performed in a cell at which the most recent transition from the CONNECTED state occurred, and whether or not any cell change has occurred for the UE since the most recent transition from the CONNECTED state with the current cell. That is, the UE can indicate if the cell in which the UE transitioned from the idle state to the connected state is the same as the cell involved in the last transition from the connected state to the idle state—and if there has been a re-selection (or there have been re-selections) in between the transitions.

In one exemplary embodiment shown at block 114 of FIG. 1 the measured time can be compared to a threshold and the reported information is whether the time elapsed is either below or above the threshold. That is, a comparison is made of a transition-related elapsed time to a predetermined threshold, and a report tells whether or not the elapsed time exceeds (or does not exceed) the threshold. The transitions can be RRC state changes from an idle to a connected state or the reverse (from a connected to an idle state). Mobility events such as cell changes for selection/re-selection or handover may be used. The threshold can be fixed (e.g. specified in the standard for the relevant radio access technology) or variable. The threshold can be cell specific and could be broadcasted in the system information. Alternatively the threshold could be sent in dedicated signaling. In any case, the threshold value is predetermined and known by both the eNB and the UE in advance of the UE reporting its mobility information on the uplink. The threshold value can take the cell type or environment into account; for example, for small cells, the value will likely be different from the one for large cells; or if the average speed within the cell can have a predicted value (pedestrian speeds in urban cells, higher speeds in cells near highways, etc.). The threshold would determine whether the UE is in high or low mobility states, such as for example how much of the UE's time is below or above the threshold, respectively. Additionally, there could be multiple thresholds providing more granularity for the mobility estimate; e.g. stationary, low, medium, high, very high, etc. In this case or the lower granularity, case the reported information may be only the UE's self-classification (stationary, low, medium, etc.).

Of course any of the specific examples above can be combined into different implementations of UE mobility information reporting. And any of the above examples can expand what is reported in the UE mobility information, so for example in addition to how many transitions or how much time has elapsed the report can also inform the network of the number of cells in which a UE has camped since the most recent connection release (transition from the CONNECTED state) or the number of cell changes between the last connection release and the new connection setup. That is, the UE may report the number of re-selections during an idle state, or the number of state transitions while being in the same cell, as part of the UE mobility information reporting.

Now are described some exemplary but non-limiting embodiments for deploying these teachings in the E-UTRAN system. These are only examples, and these teachings can also be utilized in other radio access technologies apart from E-UTRAN. One particular aspect is configuring the reporting of this UE assistance/mobility information and triggering individual reports to be sent from the UE to the network access node/eNB as shown at block 102 of FIG. 1.

In one exemplary embodiment the network broadcasts, such as in system information, information indicating activation of the mobility information reporting. That is, the information indicates that user equipment should report the mobility information. The information indicating activation of the mobility information reporting can be signaled in dedicated signaling (e.g., to a single UE).

In one exemplary embodiment the network broadcasts, such as in system information, that UEs shall send their mobility information whenever a new connection is established (or re-established). In one implementation, and in response to the trigger created by the broadcast, the actual UE mobility information report can be sent during the connection establishment/re-establishment signaling itself, as modified to include such reports in the uplink. In this case the most recent transition to the CONNECTED state may be interpreted to exclude the connection being set up. In another implementation, a new signaling regime is established during which the UE sends its mobility information report to the access node.

In another exemplary embodiment, when an RRC connection is being established, the network can request during the hand-shake procedure whether the UE has moved since the last time the UE transitioned to or from the RRC CONNECTED state. There are several ways to implement this embodiment. The UE mobility report, in response to a trigger of the network's request, can in one example indicate whether the UE has made any re-selections since the UE's last connection release. In another example, the UE mobility report can indicate whether the UE has had any connection attempts in other cells, apart from the one with which the current RRC connection is being established. In another example, the UE can indicate the time spent in the current serving cell, and in some cases this time may span over several transitions between the IDLE and the CONNECTED states. Or the report may indicate just how long the UE has been in this cell in the IDLE state. In still another example the UE mobility report can indicate the time since the UE's last connection release.

Additional information can be included in the UE mobility information report beyond only how many transitions or how much time has elapsed since a last transition. For example, if the UE has moved then in addition to indicating that the UE has moved, such reports may indicate also indicate the number of cells in which the UE has been camping since the connection release. For example, the UE mobility information report may also indicate the number of cell changes in between the last release and the new connection setup.

This reported UE mobility information can be used by the network for the purpose of helping in adjusting the settings of parameters for the UE CONNECTED state, such as for example parameters related to mobility and/or the CONNECTED state DRX (discontinuous reception) parameters, and/or for setting the value of the UE release timer which releases the current connection.

As an additional consideration which may be added to any of the above examples, when the UE is at the cell border, there may sometimes be back and forth handovers or re-selections between cells, often referred to as a ping-pong effect. This may degrade the reliability of the estimation of the UE movement. In order to avoid this reliability degradation, the UE can filter the information the UE reports so that, only if a minimum time interval is spent in a given cell, is that considered a true cell change. In this case the filtered-out re-selections are not considered among the 'most recent' transitions to or from the CONNECTED state. Similarly, the UE may also filter out some of the cell changes that have happened between the same cells.

In one implementation the UE mobility information indicates whether or not the UE is moving more as compared to its keep-alive packet transmissions (or heartbeat packet transmissions or some other term for keeping a minimally used connection established). In this implementation the UE can report "yes" or a digital "1" if there are more cell changes as compared to packet transmissions, and report "no" or a digital "0" if there are more packet transmissions as compared to cell changes. In another implementation the UE can report similar information to the network by reporting the ratio between its keep-alive packet transmissions and its cell changes. In either case, the network will have sufficiently detailed knowledge about the UE mobility and traffic pattern to find the most suitable cell for the UE or to configure the most suitable configuration for the UE, which is far more effective than using only how many cell changes the UE encountered over some long period.

One technical effect of certain of the above embodiments is that they are simple to implement since there is no variance between UE implementations, yet still provide the network with a relevant indication about the UE mobility. This means that the network can rely on the estimate regardless of the type or model of terminal that is reporting its mobility information, and regardless of different terminal manufacturers. Another advantage is that the above examples utilize the most recent history, which in some implementations can be quite short, and it is this most recent history that provides the best indication of what mobility the network can expect from the reporting UE in the near future.

Figure 2:
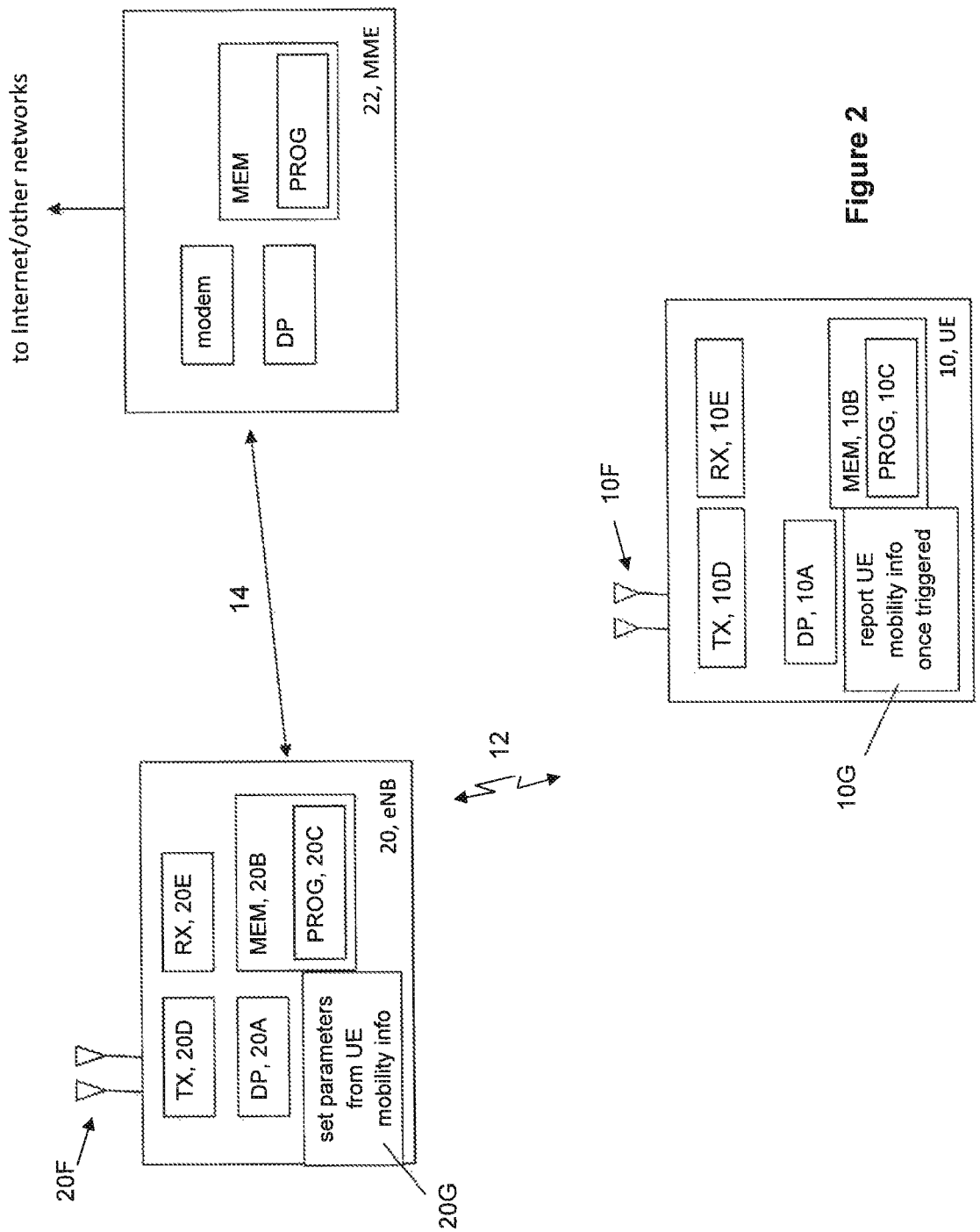
FIG. 2 is a simplified block diagram of exemplary devices suitable for use in practicing the exemplary embodiments of the invention.

Reference is now made to FIG. 2 for illustrating a simplified block diagram of various electronic devices and apparatus that are suitable for use in practicing the exemplary embodiments of this invention. In FIG. 2 a radio network includes a controlling network node such as a mobility management entity (MME) 22 and a network access node such as an eNB 20. Through the eNB 20 the radio network is adapted for communication over a wireless medium/link 12 with an apparatus, such as a mobile device/terminal or more generally a user equipment UE 10. FIG. 2 shows only one UE 10 but it is understood that the eNB 20 may be serving multiple UEs of which the illustrated UE 10 is exemplary. The eNB 20 may be any access node (including frequency selective repeaters) of any wireless network such as the E-UTRAN in the examples above, or it may be an access node (Node B, access point, base station, etc) that utilizes some other radio access technology such as for example cellular technologies GSM, GERAN, WCDMA, WLAN and the like which may manage UE mobility via mobility parameters. Through the MME 22 and control/data link 14 the radio network also provides the UEs with connectivity to further networks, for example, a data communications network/Internet and/or a publicly switched telephone network.

One UE 10 is detailed below but other UEs implementing these teachings may be functionally similar. The UE 10 includes processing means such as at least one data processor (DP) 10A, and storing means such as at least one computer-readable memory (MEM) 10B storing at least one computer program (PROG) 10C or other set of executable instructions. In some embodiments the portion of the UE 10 implementing these teachings may also include communicating means such as a transmitter TX 10D and a receiver RX 10E for bidirectional wireless communications with the eNB 20 via one or more antennas 10F. Also stored in the MEM 10B at reference number 10G is the UE's algorithm or function or selection logic for collecting the mobility information detailed by example above and for reporting that information to the eNB 20 when triggered to do so, also as detailed above in various non-limiting examples.

The eNB 20 may comprise processing means such as at least one data processor (DP) 20A, storing means such as at least one computer-readable memory (MEM) 20B storing at least one computer program (PROG) 20C or other set of executable instructions. The eNB 20 may also comprise communicating means such as a transmitter TX 20D and a receiver RX 20E for bidirectional wireless communications with the UE 10, for example via one or more antennas 20F. The eNB 20 may store at block 20G the algorithm or function or selection logic for setting the mobility parameters for the UE 10 using the UE mobility information that the eNB 20 obtains from the UE 10 via signaling as set for in the non-limiting examples above.

For completeness also the MME 22 is shown to include a DP and a MEM storing a PROG, and communicates with the eNB 20 and with the other networks via a modem.

At least one of the PROGs 10C/20G in the UE 10, and PROGs 20C/20G in the eNB 20, is assumed to include a set of program instructions that, when executed by the associated DP 10A/20A, may enable the device to operate in accordance with the exemplary embodiments of this invention, as detailed above. In these regards the exemplary embodiments of this invention may be implemented at least in part by computer software stored on the MEM 10B, 20B which is executable by the DP 10A of the UE 10 and/or by the DP 20A of the eNB 20, or by hardware, or by a combination of tangibly stored software and hardware (and tangibly stored firmware). Electronic devices implementing these aspects of the invention need not be the entire devices as depicted at FIG. 2 but may be one or more components of same such as the above described tangibly stored software, hardware, firmware and DP, or a system on a chip SOC or an application specific integrated circuit ASIC.

In general, the various embodiments of the UE 10 can include, but are not limited to digital devices having wireless communication capabilities such as personal portable radio devices which encompass but are not limited to cellular telephones, navigation devices, laptop/palmtop/tablet computers, digital cameras and music devices, and Internet appliances.

Various embodiments of the computer readable MEMs 10B, 20B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 10A, 20A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the E-UTRAN system, as noted above the exemplary embodiments of this invention may be used with various other types of wireless communication systems.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
  3GPP Third Generation Partnership Project
  DRX discontinuous reception
  eNB evolved Node B (e.g., LTE base station)
  EUTRAN Evolved UTRAN
  HetNet Heterogeneous Network
  LTE Long Term Evolution
  NAT Network Address Translation
  MME Mobility Management Entity
  PDCCH Physical Downlink Control Channel
  RRC Radio Resource Control
  UE User Equipment
  UTRAN Universal Terrestrial Radio Access Network

What is claimed is:
1. A method for operating a mobile user equipment, comprising:
  determining by the mobile user equipment that reporting of user equipment mobility information is to be performed; and
  wirelessly reporting by the user equipment to an access node of a radio network, responsive to the determining, the user equipment mobility information, the user equipment mobility information indicating at least a time period in one or both of an idle state or a connected state since a transition by the user equipment to a cell, or since a transition by the user equipment to or from a connected state with a cell.

2. The method according to claim 1, in which the reported user equipment mobility information indicates whether the user equipment has changed cells between a time period between a most recent transition from a connected state and a most recent transition to a connected state.

3. The method according to claim 1, in which the reported user equipment mobility information indicates an elapsed time between a most recent transition by the user equipment from a connected state and a most recent transition by the user equipment to a connected state.

4. The method according to claim 1, in which the reported user equipment mobility information indicates an elapsed time since a most recent transition of the user equipment to a current cell.

5. The method according to claim 1, in which the reported user equipment mobility information indicates whether the time period since a most recent transition by the user equipment to a cell, or a most recent transition by the user equipment to or from the connected state with a cell, exceeds a predetermined threshold.

6. The method according to claim 1, in which the reported user equipment mobility information indicates whether the time period since a most recent transition by the user equipment to a cell, or a most recent transition by the user equipment to or from the connected state with a cell, does not exceed a predetermined threshold.

7. The method according to claim 6, further comprising wirelessly receiving at the user equipment the threshold via one of broadcast signaling or dedicated signaling.

8. The method according to claim 1, in which the reported user equipment mobility information indicates whether connection setup was performed in a cell at which a most recent transition from the connected state occurred, and whether or not any cell change has occurred for the user equipment since the most recent transition from the connected state.

9. The method according to claim 1, in which the reported user equipment mobility information indicates a number of re-selections during an idle state.

10. The method according to claim 1, in which the reported user equipment mobility information indicates a number of state transitions while the user equipment is in a same cell.

11. The method according to claim 1, further comprising the user equipment filtering a number of reselections or a number of handovers to one or more cells based on the user equipment not spending a minimum time interval in the one or more cells.

12. The method according to claim 1, in which the user equipment determines reporting the user equipment mobility information is to be performed in response to reception of broadcast signaling indicating that user equipment mobility reporting is active and the user equipment should report mobility information for a new transition by the user equipment to a connected state.

13. The method according to claim 12, further comprising:
receiving the broadcast signaling indicating that the user equipment mobility reporting is active and the user equipment should report mobility information for a new transition by the user equipment to a connected state; and determining the reporting the user equipment mobility information is to be performed in response to the reception of the broadcast signaling.

14. The method according to claim 1, in which the user equipment determines reporting the user equipment mobility information is to be performed in response to reception of dedicated signaling indicating that user equipment mobility reporting is active and the user equipment should report mobility information for a new transition by the user equipment to a connected state.

15. The method according to claim 1, in which the user equipment determines reporting the user equipment mobility information is to be performed in response to a request received in a handshake procedure during signaling that causes a new transition by the user equipment to a connected state, the request requesting whether the user equipment has moved since a last time the user equipment transitioned to or from the connected state.

16. The method according to claim 15, further comprising:
receiving at the user equipment the request requesting whether the user equipment has moved since the last time the user equipment transitioned to or from the connected state; and
determining by the user equipment that reporting the user equipment mobility information is to be performed in response to the reception of the request.

17. The method according to claim 1, in which the reported user equipment mobility information indicates a first digital value for whether there are more cell changes as compared to packet transmissions, and indicates a second digital value for whether there are more packet transmissions as compared to cell changes.

18. The method according to claim 1, in which the reported user equipment mobility information indicates a ratio between keep-alive packet transmissions by the user equipment and cell changes by the user equipment.

19. The method according to claim 1, in which the user equipment mobility information is reported by the user equipment to the access node during a new transition to a connected state.

20. A mobile user equipment, comprising:
one or more processors; and
one or more memories including computer program code, the one or more memories and the computer program code configured, with the one or more processors, to cause the mobile user equipment to perform at least the following:
determine that reporting of user equipment mobility information is to be performed; and
wirelessly report to an access node of a radio network, responsive to the determining, the user equipment mobility information, the user equipment mobility information concerning at least a time period in one or both of an idle state or a connected state since a transition by the user equipment to a cell, or to a transition by the user equipment to or from a connected state with a cell.

21. The mobile user equipment according to claim 20, in which the reported user equipment mobility information indicates whether the user equipment has changed cells between a time period between a most recent transition from a connected state and a most recent transition to a connected state.

22. The apparatus mobile user equipment according to claim 20, in which the reported user equipment mobility information indicates an elapsed time between a most recent transition by the user equipment from a connected state and a most recent transition by the user equipment to a connected state.

23. The mobile user equipment according to claim 20, in which the reported user equipment mobility information indicates an elapsed time since a most recent transition by the user equipment to a current cell.

24. The mobile user equipment according to claim 20, in which the reported user equipment mobility information indicates whether the time period since a most recent transition by the user equipment to a cell, or a most recent transition by the user equipment to or from the connected state with a cell, exceeds a predetermined threshold.

25. The mobile user equipment according to claim 20, in which the reported user equipment mobility information indicates whether the time period since a most recent transition by the user equipment to a cell, or a most recent transition by the user equipment to or from the connected state with a cell, does not exceed a predetermined threshold.

26. The mobile user equipment according to any one of claim 24 or 25, further comprising receiving the threshold via one of broadcast signaling or dedicated signaling.

27. The mobile user equipment according claim 20, in which the reported user equipment mobility information indicates whether connection setup was performed in a cell at which a most recent transition from the connected state occurred, and whether or not any cell change has occurred for the user equipment since the most recent transition from the connected state.

28. The mobile user equipment according to claim 20, in which the reported user equipment mobility information indicates a number of re-selections during an idle state.

29. The mobile user equipment according to claim 20, in which the reported user equipment mobility information indicates a number of state transitions while the user equipment is in a same cell.

30. The mobile user equipment according to claim 20, further comprising means for filtering a number of reselections or a number of handovers to one or more cells based on the user equipment not spending a minimum time interval in the one or more cells.

31. The mobile user equipment according to claim 20, in which the user equipment determines reporting the user equipment mobility information is to be performed in response to reception of broadcast signaling indicating that user equipment mobility reporting is active and the user equipment should report mobility information for a new transition by the user equipment to a connected state.

32. The mobile user equipment according to claim 31, further comprising:
 means for receiving the broadcast signaling indicating that the user equipment mobility reporting is active and the user equipment should report mobility information for a new transition by the user equipment to a connected state; and
 means for determining the reporting the user equipment mobility information is to be performed in response to the reception of the broadcast signaling.

33. The mobile user equipment according to claim 20, in which the user equipment determines reporting the user equipment mobility information is to be performed in response to reception of dedicated signaling indicating that user equipment mobility reporting is active and the user equipment should report mobility information for a new transition by the user equipment to a connected state.

34. The mobile user equipment according to claim 20, in which the user equipment determines reporting the user equipment mobility information is to be performed in response to a request received in a handshake procedure during signaling that causes a new transition by the user equipment to a connected state, the request requesting whether the user equipment has moved since a last time the user equipment transitioned to or from the connected state.

35. The mobile user equipment according to claim 34, further comprising:
 means for receiving the request requesting whether the user equipment has moved since the last time the user equipment transitioned to or from the connected state; and means for determining the reporting the user equipment mobility information is to be performed in response to the reception of the request.

36. The mobile user equipment according to claim 20, in which the reported user equipment mobility information indicates a first digital value for whether there are more cell changes as compared to packet transmissions, and indicates a second digital value for whether there are more packet transmissions as compared to cell changes.

37. The mobile user equipment according to claim 20, in which the reported user equipment mobility information indicates a ratio between keep-alive packet transmissions by the user equipment and cell changes by the user equipment.

38. The mobile user equipment according to claim 20, in which the user equipment mobility information is reported during a new transition to a connected state.

39. The method according to claim 1, the method further comprising:
 in response to the user equipment receiving a reply from the radio network to the reported user equipment mobility information, updating mobility parameters at the user equipment according to the received reply.

40. The mobile user equipment according to claim 20, wherein the one or more memories and the computer program code are configured with the one or more processors to further cause the mobile user equipment to perform:
 in response to the user equipment receiving a reply from the radio network to the reported user equipment mobility information, update mobility parameters stored at the user equipment according to the received reply.

* * * * *

UNITED STATES PATENT AND TRADEMARK OFFICE
CERTIFICATE OF CORRECTION

PATENT NO. : 9,497,674 B2
APPLICATION NO. : 14/394267
DATED : November 15, 2016
INVENTOR(S) : Koskinen et al.

Page 1 of 1

It is certified that error appears in the above-identified patent and that said Letters Patent is hereby corrected as shown below:

In the Claims

Claim 22, Column 12, Line 60 "apparatus" should be deleted.

Signed and Sealed this
Thirteenth Day of February, 2018

Andrei Iancu
*Director of the United States Patent and Trademark Office*